(12) United States Patent
Gao et al.

(10) Patent No.: US 6,309,571 B2
(45) Date of Patent: Oct. 30, 2001

(54) METHOD AND APPARATUS FOR THE CONTROL OF INJECTION MOLDING

(75) Inventors: Furong Gao, Kowloon (HN); Chunhua Zhao, West Lafayette, IN (US)

(73) Assignees: The Hong Kong University of Science & Technology, Hong Kong; Moog Japan Ltd. (JP)

( * ) Notice: Subject to any disclaimer, the term of this patent is extended or adjusted under 35 U.S.C. 154(b) by 0 days.

(21) Appl. No.: 09/031,834

(22) Filed: Feb. 27, 1998

(51) Int. Cl.⁷ ................................................. B29C 45/77
(52) U.S. Cl. .................. 264/40.1; 264/40.5; 264/328.1; 425/145; 425/149; 700/50; 700/203
(58) Field of Search ................................ 264/40.1, 40.5, 264/328.1; 425/145, 149; 364/475.05, 475.08, 148.05; 700/200, 203, 50

(56) References Cited

U.S. PATENT DOCUMENTS

| | | | |
|---|---|---|---|
| 3,642,404 | * | 2/1972 | Nagawa ................................ 425/145 |
| 3,840,312 | * | 10/1974 | Paulson et al. ....................... 425/145 |
| 3,859,400 | * | 1/1975 | Ma ........................................ 425/145 |
| 4,325,896 | * | 4/1982 | Rodgers, Jr. ......................... 264/40.1 |
| 4,745,541 | * | 5/1988 | Vaniglia et al. . |
| 5,149,472 | | 9/1992 | Suganuma . |
| 5,173,224 | | 12/1992 | Nakamura et al. . |
| 5,176,858 | | 1/1993 | Tsukabe et al. . |
| 5,578,256 | * | 11/1996 | Austin .................................. 264/40.5 |
| 5,665,283 | * | 9/1997 | Bader et al. ......................... 264/40.1 |
| 5,945,046 | * | 8/1999 | Hehl et al. ........................... 264/40.1 |

FOREIGN PATENT DOCUMENTS 3-204002    9/1991   (JP) .

* cited by examiner

Primary Examiner—Jill L. Heitbrink
(74) Attorney, Agent, or Firm—Burns, Doane, Swecker & Mathis, L.L.P.

(57) ABSTRACT

This invention relates to a method and apparatus for the control of injection molding and, in particular, for determining a suitable time for transfer from injection velocity control to packing pressure control. The invention uses a derivative of, preferably the nozzle pressure, and inputs this to a fuzzy inference system. The fuzzy inference system uses said rules and knowledge to provide a suitable transfer time as an output. It is preferred that the sample pressure is filtered prior to calculation of the derivative.

12 Claims, 6 Drawing Sheets

Nozzle Pressure Variations with Different Melt Temperatures

Nozzle Pressure with Different Injection Velocities dP Variations with Different
Injection Velocities Nozzle Pressure Variation During
Injection and Packing-Holing dP Signal Before Filtered dP Signal After Filtered Membership Functions for Input1

Membership Functions for Input2

Membership Functions for Output

METHOD AND APPARATUS FOR THE CONTROL OF INJECTION MOLDING

FIELD OF THE INVENTION

This invention relates to a method and apparatus for the control of injection molding and, in particular, although not necessarily solely, thermoplastic injection molding. The invention relates to a method and apparatus for determining the transfer point from the filling stage to the packing-holding stage.

BACKGROUND

Injection molding relies on the correct identification for the timing of the transfer from injection velocity control to packing pressure control for the production of a quality article. An early transfer can result in a short shot or a part with non-uniformity due to a portion of the cavity being filled during the packing-holding phase. Alternatively, a later transfer results in a mold flash, excessive residual stresses in the parts, and ejection problems.

Current procedures have identified different criteria based on the measurement of specific variables to determine the correct transfer point for transfer from velocity control to packing pressure control. The variables used have been the injection stroke, injection filling time, cavity pressure, nozzle pressure, nozzle pressure derivative or cavity pressure derivative.

The first two of these measurements are volume based. The accuracy is strongly affected by the leakage of the melt through the check ring valve and are also variable due to changes in melt density or variations in the melt temperature.

If criteria are based on cavity pressure or nozzle pressure, the transfer from injection velocity control to packing pressure control takes place when the measurement of the cavity or nozzle pressure reaches a predetermined value. For a specific molding condition, cavity pressure can indicate the degree of filling. However, the installation of a transducer to measure the pressure in the mold increases the tooling costs and introduces undesirable marks on the surface of the molded parts. The use of nozzle pressure provides a less direct indication of the status of the material in the cavity but does not have the installation problem of the cavity pressure measurement. Regardless, both are variable according to the specific molding conditions such as the material, mold geometry, melt temperature and injection velocity.

As an alternative, the nozzle pressure derivative and cavity pressure derivative have been proposed to overcome some of these problems. A rapid change in pressure is expected when the cavity is approaching being completely filled. Again, criteria based on the cavity pressure derivate require measurement of this pressure and, therefore, runs the risk of leaving marks on the surface of the tooling and increased tooling costs. Therefore, the criteria based on the nozzle pressure derivative may be preferred.

All of these measurements also require the criteria to perform a comparison of the proposed measurement against a predetermined threshold. It is the determination of this threshold which is critical to the success of the operation. The choice of a low threshold leads to an early transfer while a high threshold can lead to a late transfer and, potentially, a mold flash.

Nozzle or cavity derivatives are dependent on molding conditions such as injection velocity, melt temperature, material and mold geometry. Therefore, every time that the molding conditions are changed, the predetermined threshold requires reconsideration. This involves an extensive trial and error process at present.

OBJECT OF THE INVENTION

It is an object of the present invention to provide a method and apparatus for injection molding which can improve on the previous attempts at determining the transfer point from injection velocity control to packing pressure control to avoid at least some of the problems of the prior art.

SUMMARY OF THE INVENTION

Accordingly, in a first aspect, the invention consists in a method of controlling the transfer point from injection velocity control to packing pressure control during injection molding comprising the steps of:

sensing the nozzle pressure or cavity pressure in the mold at discreet intervals;

calculating the differential pressure at discreet intervals;

calculating at least one input based on said differential pressure for input into a fuzzy inference system;

applying knowledge from said fuzzy inference system and outputting a value indicating a suitable time to transfer from injection velocity control to packing pressure control.

Accordingly, in a second aspect, the invention consists in an apparatus for the control of injection molding to determine the transfer point from injection velocity control to packing pressure control comprising:

sensing means to sense the pressure in the mold cavity or nozzle pressure;

processing means to sample said pressures at discreet intervals;

processing means to calculate the differential of said pressures;

a fuzzy inference system to use inputs relative to said derivatives of said pressure and output an indication of a transfer time from injection velocity control to packing pressure control.

DESCRIPTION OF THE DRAWINGS

The invention will now be described with reference to the following drawings in which.

DETAILED DESCRIPTION OF PREFERRED EMBODIMENTS

Figure 1A:
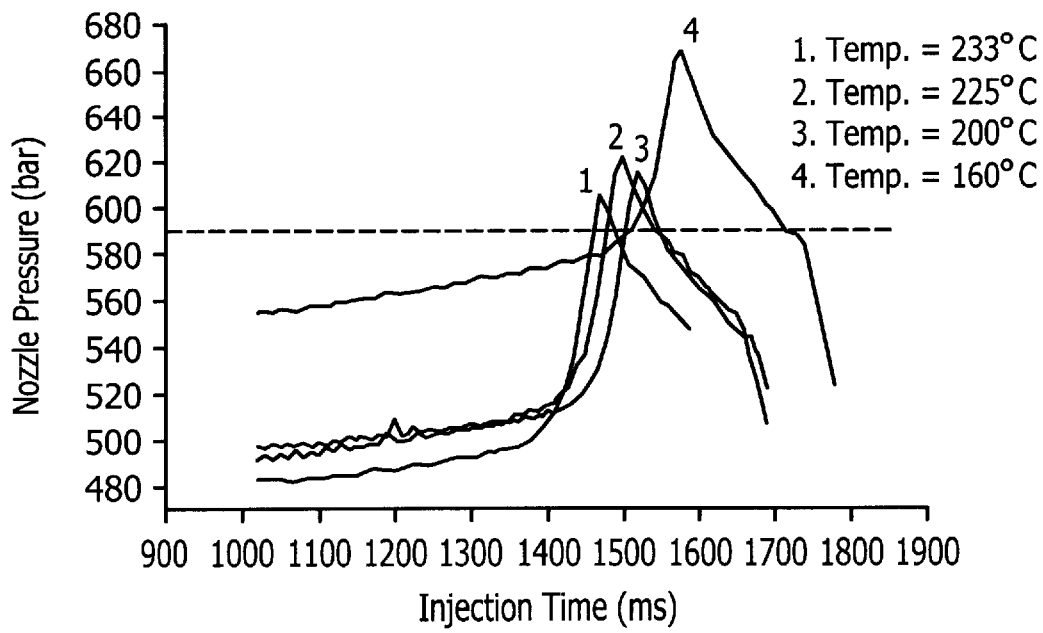
FIG. 1(a) shows a graphical representation of nozzle pressure variations with different melt temperatures.

Injection molding is a widely used technique to produce a large variety of plastic parts. The demand for quality in such plastic parts is increasing.

The injection molding process is a cyclic process consisting of three phases. The phases are a filling stage, a packing-holding phase and a cooling phase.

The filling stage allows a polymer melt to flow under pressure into the cavity. The rate at which the polymer enters the mold may be approximated by injection velocity and this plays an important role in determining the quality of the molded parts. Injection velocity is normally controlled in a closed-loop during this phase.

Toward the end of filling, the pressure within the cavity rises rapidly due to the melt compression when the mold is nearly filled. At this point, the injection velocity control has to be stopped and packing pressure controls starts. Additional material is forced during the packing phase into the cavity to compensate for the shrinkage associated with the cooling and solidification to produce parts with good mechanical properties, dimensional stability and surface characteristics.

One of the dangers in injection molding is that overpacking of the mold can cause mold flash, excessive residual stresses in the parts, and part ejection problems.

The final stage is cooling during which there is no flow into or out of the cavity and the gate.

To produce parts with good and consistent quality, the injection molding process must transfer control from injection velocity control to packing pressure control at the right instance. Ideally, this is at the time when the mold is completely filled.

Should the transfer occur early, the product produced will either be a short shot, or a part with non-uniformity due to a portion of the cavity being filled during the packing-holding phase. A late transfer can result in over-packing of the mold and can result in a flash, and ejection problems.

Control systems have been suggested based on the measurement of a number of variables to determine the transfer point from injection velocity control to packing pressure control "V/P transfer point". The criteria suggested for measurement have been injection stroke, injection filling time, cavity pressure, nozzle pressure and the derivatives of cavity and nozzle pressures.

Both the injection stroke and injection filling time are volume based. The accuracy is strongly affected by the melt leakage through the check ring valve and changes in melt density due to variations in the melt temperature.

For the next two criteria, the transfer must take place when the measurement of the cavity pressure or the nozzle pressure reaches a predetermined value. Again, this is specific to a particular molding condition. Changes of materials, mold geometry, melt temperatures and injection velocity will require different predetermined values for the correct transfer point.

Another difficulty with use of cavity pressure is that the installation of a transducer to measure the pressure in the mold increases the tooling costs and introduces the risk of undesirable marks on the surface of the molded parts.

A measurement of nozzle pressure does not have the installation problems, however it is a less direct indication of the status of the material in the cavity.

Figure 1B:
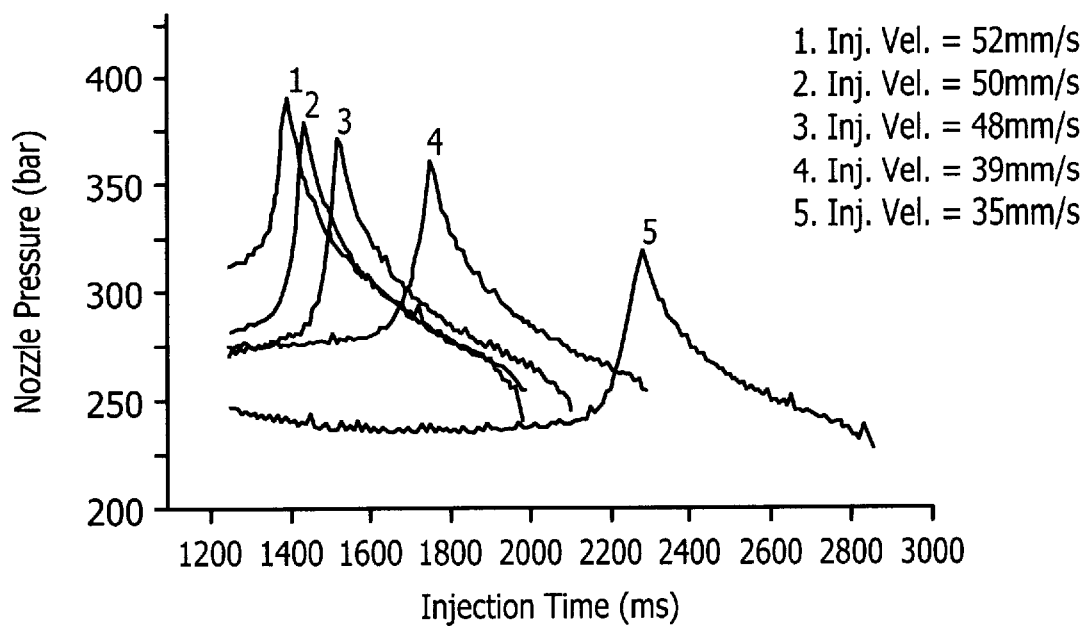
FIG. 1(b) shows a graphical representation of nozzle pressures having different injection velocities.

Referring to FIG. 1, FIG. 1(a) demonstrates the variation in the nozzle pressure with different melt temperatures at a set injection velocity. It can be seen that a variation from 160° C. to 233° C. causes a large change in nozzle pressures making a predetermined value difficult to predict. Similarly, the variation in nozzle pressure with different injection velocities at a set temperature are shown in FIG. 1(b). The threshold value for the nozzle pressure to indicate the transfer point is very different in the five examples with injection velocities of 35 mm/s to 52 mm/s.

An alternative is to use the derivative of the nozzle pressure or the cavity pressure. A rapid change in such pressures is expected when the cavity is filled or almost completely filled.

Figure 2:
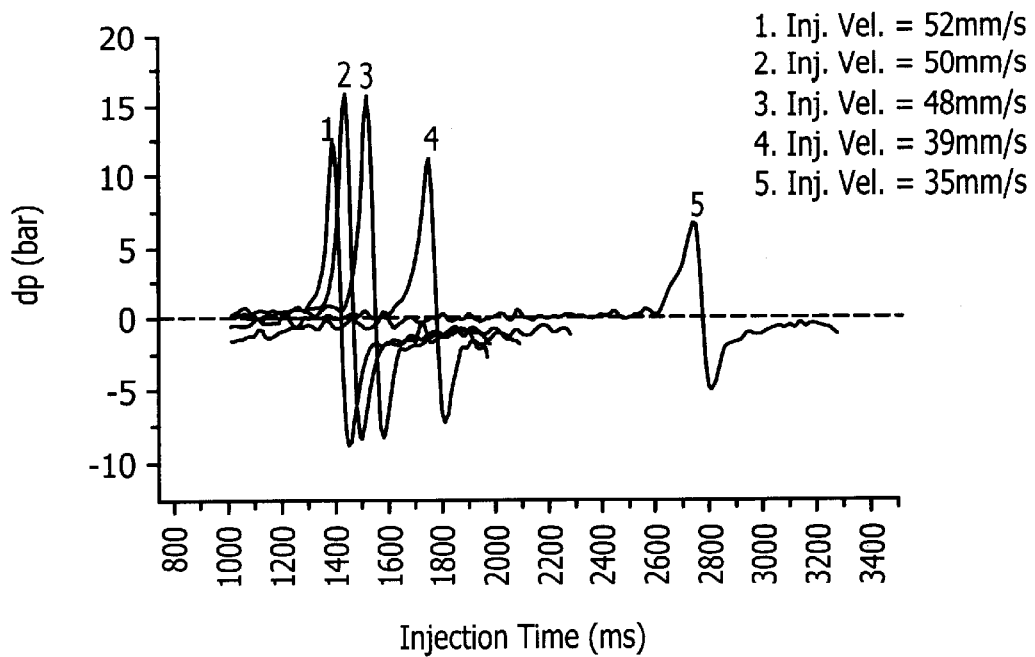
FIG. 2 is a graphical representation of derivative pressure variations with different injection velocities.

Referring to FIG. 2, the derivatives of the nozzle pressure are shown for different injection velocities being the same cases as shown in FIG. 1(b). It can still be seen that variations exist due to different injection velocities and it can be expected that similar variations will exist with other molding conditions such as melt temperature, material and melt geometry change. Therefore, the threshold for the nozzle pressure derivative will have to be adjusted every time when the molding condition is changed. This involves an extensive trial-and-error process which is both time consuming and wasteful.

Figure 3:
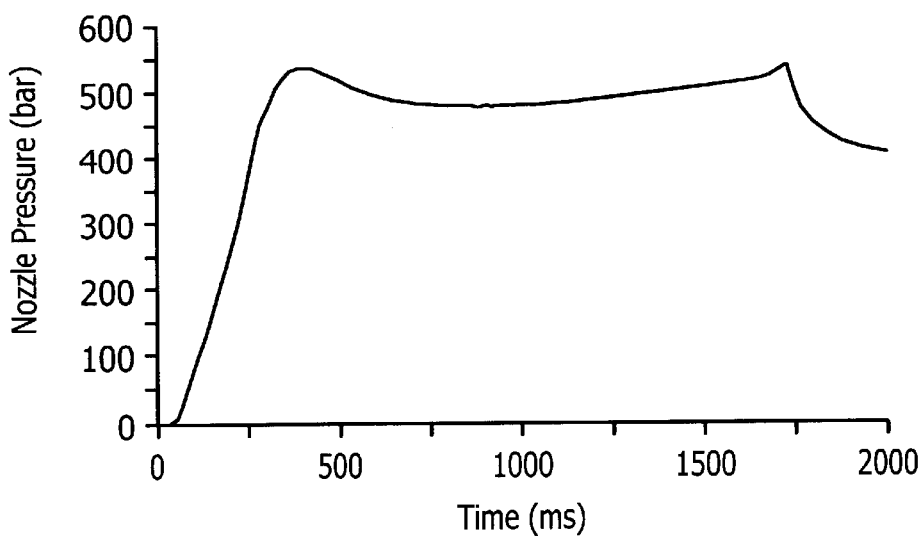
FIG. 3 is a graphical representation of the nozzle pressure variation during injection and packing-holding.

FIG. 3 provides a nozzle pressure profile during the filling and packing stage. As with FIGS. 1(a) and 1(b), it can be observed that a rapid increase in pressure occurs near the time when the cavity is filled. Therefore, for whatever the molding condition, we can conclude that a significant nozzle pressure increase will occur when the mold is nearly filled and a V/P transfer should take place immediately.

The present invention seeks to provide a method and apparatus that compares relative changes in the nozzle or cavity pressure rather than the absolute values of the pressure or absolute values of the pressure derivative.

Figure 4:
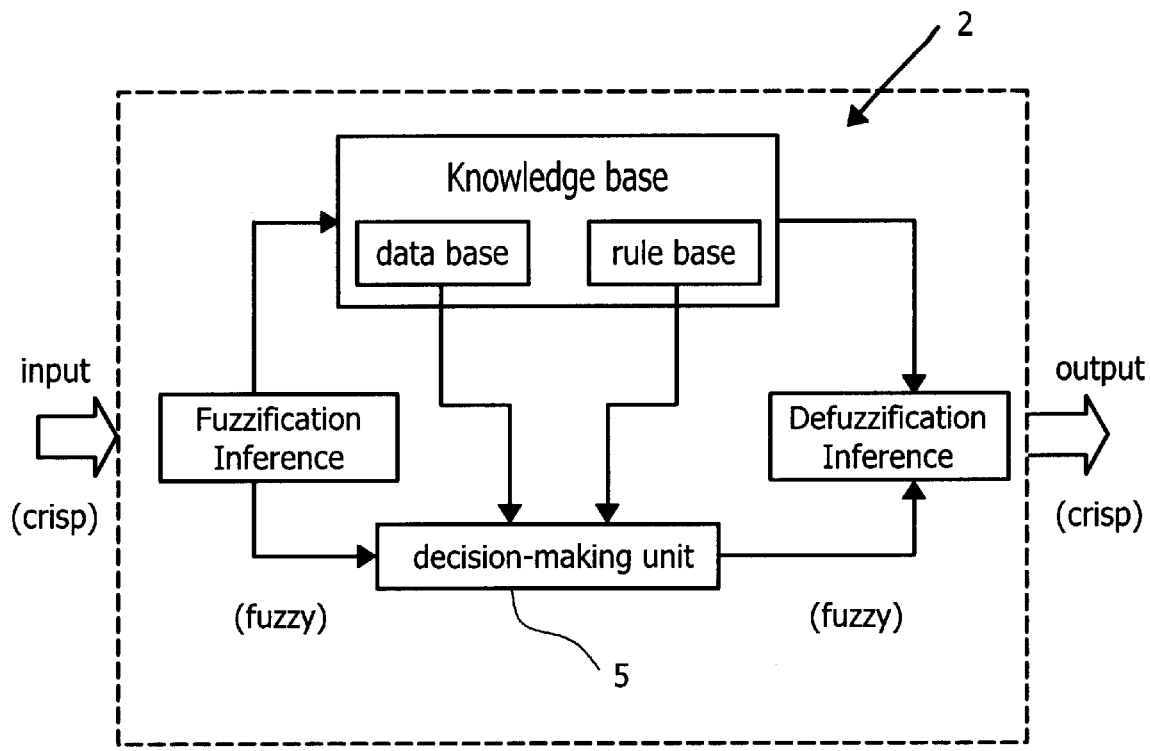
FIG. 4 is a schematic representation of a common fuzzy inference system structure.
Figure 7:
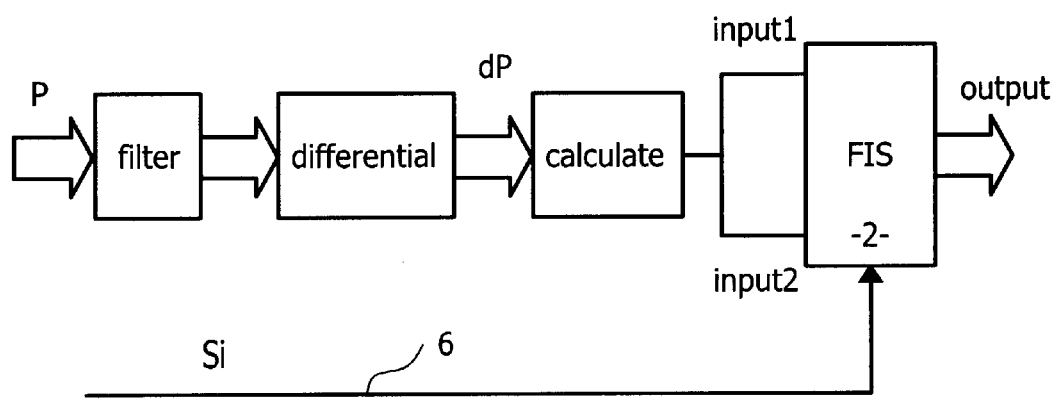
FIG. 7 is a schematic diagram of the overall structure of the system in accordance with one embodiment of the invention.

In a preferred embodiment of the present invention, the invention provides a fuzzy inference system 2, as shown in FIG. 7. A basic fuzzy inference system is shown schematically in FIG. 4 where it can be seen that a crisp input is changed into a fuzzified input by comparison of the inputs with membership functions. The fuzzified inputs are then combined through a specific T-norm operation to obtain a firing strength for each of the rules. The firing strength for all the rules have been combined to generate a qualified consequence in the decision making unit 5. The result can then defuzzified to produce a crisp output from the aggregated qualified consequence.

Generally such fuzzy inference systems can be classified into two types being Mamadani and Takagi-Sugeno. Either system may be employed to practise this particular invention.

The preferred embodiment of this invention seeks to use at least one input relative to a pressure derivative from the injection molding apparatus which, in this preferred example, utilizes the nozzle pressure. The input is directed towards a fuzzy inference system to provide an output which can be used to determine the optimal time for transfer from the injection velocity control to the packing pressure control.

The inputs may vary according to the type of fuzzy inference system utilized. In this preferred example, the nozzle pressure may be processed to determine the differential of the pressure and the sharp increase in differential pressure can be expressed as the relationship $dP(i+1) > dP(i) > dP(i-1)$ where $dP(i+1) = P(i+1) - P(i)$. In this relationship, $P(i)$ is the pressure of the ith sampling instance.

In addition to providing an input related to the differential pressure, an additional variable may be input to represent the early trend of the nozzle pressure data. Such an additional variable assists in preventing a false decision. The additional variable used to provide an input in this preferred example is a variable max_avr. The variable max_avr for the preferred embodiment is the largest value of the past several consecutive dP(i) averages. The system inputs to the fuzzy inference system have been chosen as dP(i+1)/dP(i) and dP(i+1)/max_avr. The output from the fuzzy inference system is a single output indicating an optimal V/P transfer time.

The range of variation for these inputs has been based on data analysis. For the first input, the range is found to be 1.0 to 2.2. The range for the second input is found to be 1.5 to 3.5.

The range of the output is set to be 0 to 1 with the output close to 0.5 indicating the optimal transfer point. An output value significantly smaller than 0.5 indicates that it is too early to carry out the transfer. An output value significantly larger than 0.5 indicates the transfer is too late.

As with all fuzzy inference systems, linguistic terms are set for the inputs. These two inputs are defined to be small, medium or large. The linguistic terms assigned to the output are early, exact and late. To simplify this particular fuzzy inference system, the membership functions for both the inputs are chosen to the triangle shape for the linguistic terms large and small and a Gauss function is selected for the medium for its narrow shape. The output membership function is chosen to be a triangular shape with the cross point at 0.5.

The rule base used is given in Table 1 below:

| input1,2 | small | medium | large |
| --- | --- | --- | --- |
| small | early(1) | early(1) | early(1) |
| medium | early(0.5) | exact(1) | late(0.5) |
| large | early(0.5) | exact(0.5) | late(1) |

The values in the parentheses are the weights of each of the rules.

In this example, the Mamadanis type FIS is adopted. For rule firing, the fuzzy relation "Min" is used to combine the inputs for each rule; for combination, the fuzzy relation "Max" is used to combine every rules' outputs; and the "centre of area" is used to defuzzify the system output into a crisp value.

This particular fuzzy inference system is developed in house with "C" programming to detect in real time the proper V/P transfer for injection molding.

Figure 5A:
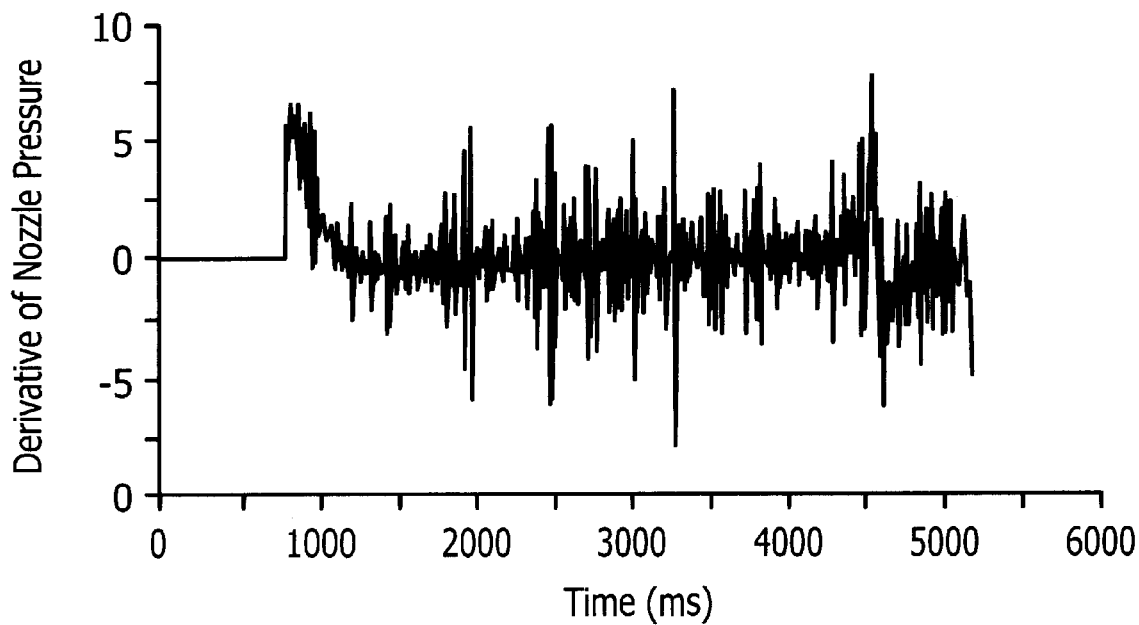
FIG. 5(a) is a graphical representation of the derivative pressure signal prior to filtering.

As it is differential pressure which is being used in this preferred example, the results of pressure differentiation amplify noise measurement from the transducer. A plot of dP as shown in FIG. 5(a). It can be observed that it is difficult to find any clear trend from such a noisy dP signal. Therefore, the preferred embodiment will include a filter designed to remove such noise from the pressure signal before differentiation. Preferably, a low pass filter is utilized to remove high frequency noise and the filter has a minimum phase shift so that the detection of the V/P transfer will not be affected. Although a wide variety of different filter types may be used, the preferred example uses a second order Chebyshev type I filter with a 0.5 dB ripple in the pass-band. This particular filter is selected for its small phase lag and its simplicity.

Of course, some transducers include good filtering already and no separate filter would be required.

Figure 5B:
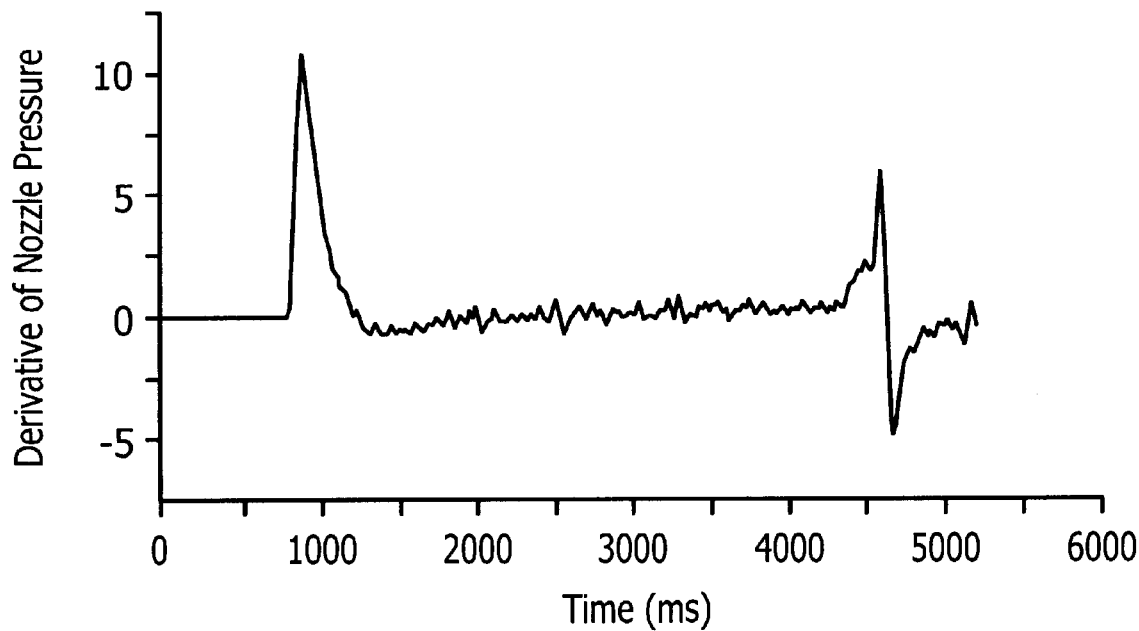
FIG. 5(b) is the derivative pressure signal of FIG. 5(a) after filtering.
Figure 6A:
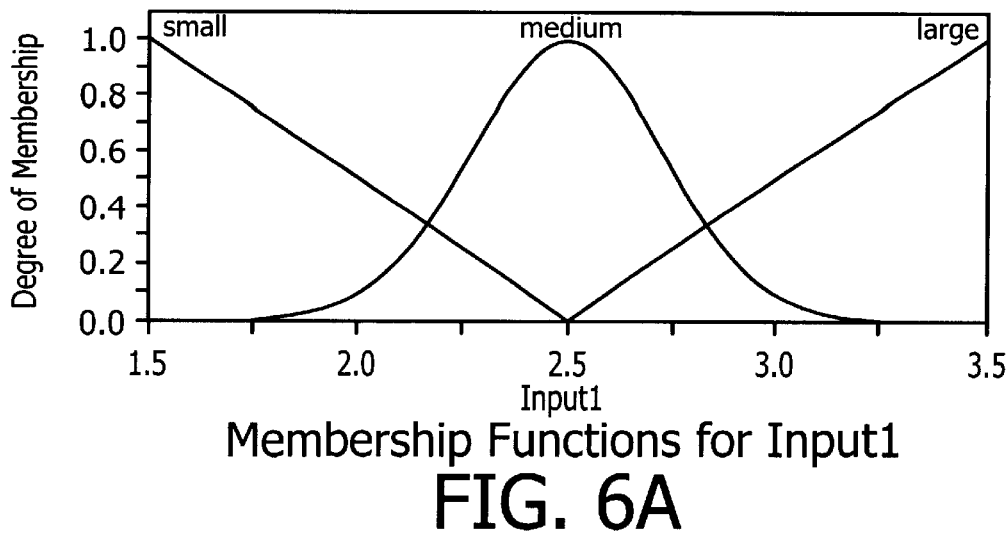
FIGS. 6(a), (b) and (c) are representations of the membership functions for inputs 1, 2 and the output from the fuzzy inference system.
Figure 6B:
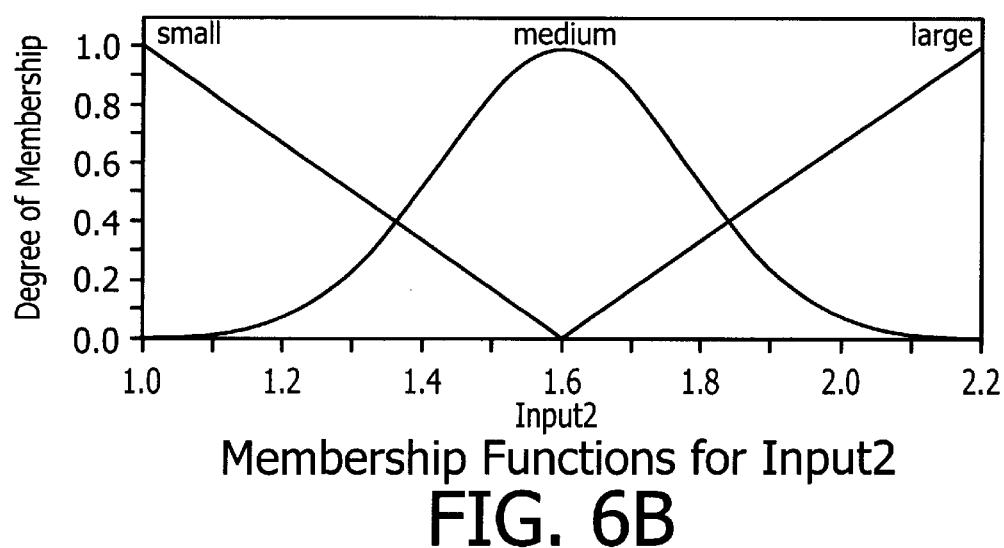
Figure 6C:
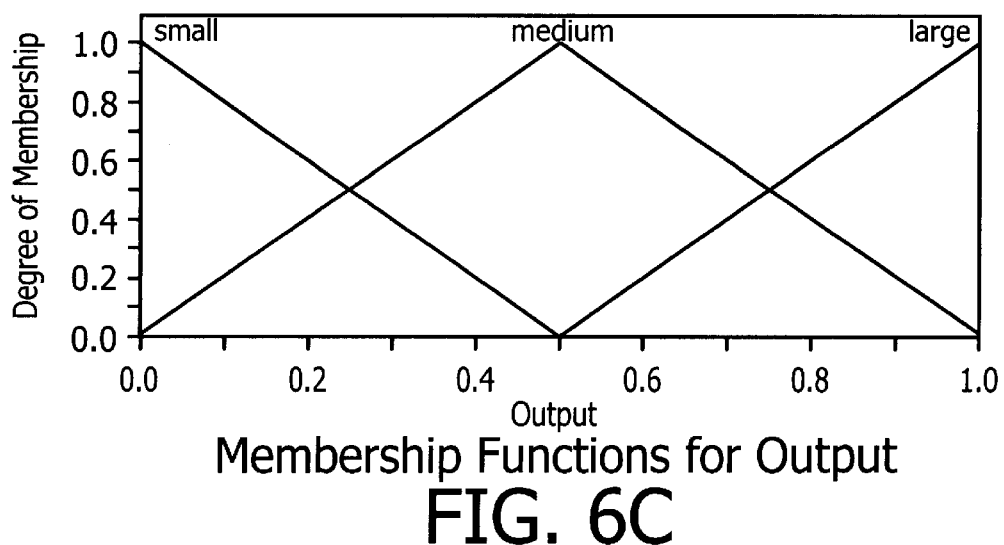

In using such a filter, FIG. 5(b) shows a filtered dP signal. It is clear from this figure that the filtered signal is much cleaner and the trend of the original signal is retained.

To reduce calculation time, it is preferred that the fuzzy inference system only commences work as the likely transfer point approaches. For the sake of simplicity, for the first injection cycle it may be easier to provide a rough estimation of the injection stroke and commence the system when the injection stroke reaches, for example, 50% of the estimated stroke. This will allow a reduction in the computation requirement. For the second cycle and thereafter the fuzzy inference system may commence work only after the injection stroke has reached a predetermined percentage of the total injection stroke of the preceding cycle. A percentage such as 80% may be more than sufficient to ensure the transfer point is not late. Although the transfer point varies as the mold temperature increases and as conditions might change during a set molding sequence, it is unlikely that the injection stroke would change by more than a few percent between successive cycles.

The injection stroke may be input into the fuzzy inference system as a crisp input 6 as shown in FIG. 7 to determine when to start the FIS system.

Figure 8:
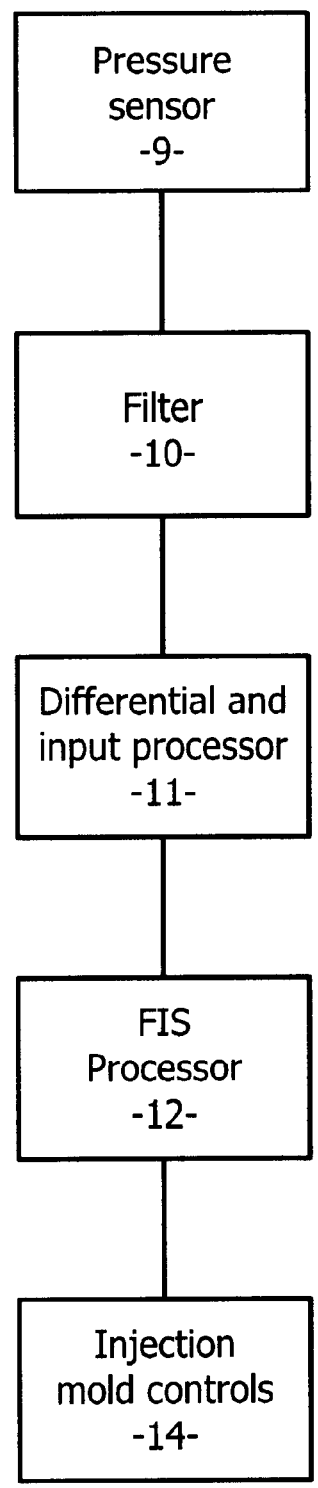
FIG. 8 is a schematic of the apparatus of a preferred embodiment.

FIG. 8 shows the apparatus for at least one embodiment. As can be seen, the sensor 9 and filter 10 provide the data to a series of processors 11, 12 to perform the steps. Clearly, these processors may comprise a single processor or multiple processors tasked with one or more steps. The output may be sent directly to the injection molding control system 14.

EXPERIMENTAL RESULTS

The data for FIGS. 1(a) and 1(b) were obtained from injection molding experiments without using the proposed V/P transfer system. It is obvious that the transfer has occurred too late. These experimental data are used as the inputs to the developed V/P transfer system in accordance with the preferred embodiment. The system is able to produce correct transfer points for all the cases. These transfer times are shown in Table 2 below:

| Inj. Vel. (mm/s) | 52 | 50 | 48 | 39 | 35 |
| --- | --- | --- | --- | --- | --- |
| Recommended V/P by FIS (ms) | 1320 | 1400 | 1480 | 1660 | 2170 |
| Melt. Temp (° C.) | 233 | 225 | 200 | 160 | |
| Recommended V/P by FIS (ms) | 1410 | 1450 | 1470 | 1530 | |

Experiments were successfully carried out to test the preferred embodiment using a mold for an automobile engine cup. A simple rectangular fan gate cavity was used to replace the previous mold. Again, the system in accordance with that preferred embodiment was found to be able to produce the proper transfer time automatically without any adjustment. A further experiment was performed on a different injection molding machine with a box mold. The preferred embodiment was again able to accurately predict the V/P transfer point without any adjustment.

To analyse the consistency, 100 parts were produced for the engine cup part. The weights of the parts produced using the preferred embodiment were found to vary within a standard deviation of 0.0147 g. This is with an average part weight of 33.5 g.

This is compared with a 100 parts made with the original V/P transfer system. In that instance, the part weights were found to vary within a standard deviation of 0.0716 g being significantly larger than that preferred embodiment.

Thus it can be seen that the preferred embodiment uses a fuzzy inference system to analyse inputs related to the nozzle pressure derivative and is able to accurately predict V/P transfer times.

What is claimed is:

1. A method for the control of injection molding and the determination of a transfer point from injection velocity control to packing pressure control comprising:

sensing a nozzle pressure or cavity pressure in a mold at discreet time intervals;

calculating a differential of the sensed nozzle or cavity pressure at said discreet time intervals;

calculating at least one input based on said differential pressure for input into a fuzzy inference system applying knowledge from said fuzzy inference system and outputting a value indicating a suitable time to transfer from injection velocity control to packing pressure control; and wherein said input is calculated by using $dP(i+1)/dP(i)$ where $dP(i+1)=P(i+1)-P(i)$ and $P(i)$ denotes the pressure at the ith sampling time interval.

2. The method for the control of injection molding as claimed in claim 1, wherein a second input is provided to said fuzzy inference system which represents an early trend of pressure data.

3. The method for the control and injection molding as claimed in claim 2, wherein said second input is defined as $dP(i+1)/max\_avr$ where $dP(i+1)=P(i+1)-P(i)$ and $P(i)$ denotes the pressure at the ith sampling time interval and $max\_avr$ is an additional variable representing the early trend of pressure data.

4. The method for the control of injection molding as claimed in claim 1, wherein a filter is provided to remove high frequency noise from a pressure signal before calculation of the pressure derivative.

5. The method for the control of injection molding as claimed in claim 1, wherein said fuzzy inference system is provided with an input representative of the injection stroke and commences operation only after a predetermined percent of that input has been achieved.

6. The method for the control of injection molding as claimed in claim 1, wherein said at least one input based on said differential pressure is an input being a ratio of differential pressures from different time intervals.

7. A method for the control of injection molding and the determination of a transfer point from injection velocity control to packing pressure control comprising:

sensing a nozzle pressure or cavity pressure in a mold at discrete time intervals;

obtaining the nozzle pressure or cavity pressure in the mold at discrete time intervals;

calculating at least one input based on a ratio of relative changes in pressure for input into a fuzzy inference system; and applying knowledge from said fuzzy inference system and outputting a value indicating a suitable time to transfer from injection velocity control to packing pressure control.

8. An apparatus for the control of injection molding to provide a transfer time for transfer from injection velocity control to packing pressure control comprising:

sensing means to sense and sample the pressure in a mold cavity or nozzle pressure at discrete time intervals;

processing means to calculate the differential of said pressures;

a fuzzy inference system for utilizing inputs relative to said derivatives of said pressure and for outputting an indication of a transfer time from injection velocity control o packing pressure control; and wherein said ratio of differential pressures includes input $P(i+1)/dP(i)$ where $dP(i+1)=P(i+1)-P(i)$ and $P(i)$ denotes the pressure at the ith sampling time interval.

9. The apparatus for the control of injection molding as claimed in claim 8, wherein a filter is provided to remove high frequency noise prior to calculation of the differential of said pressures.

10. The apparatus for the control of injection molding as claimed in claim 8, wherein a second input is defined as $dP(i+1)/max\_avr$ where $max\_avr$ is an additional variable which represents an early trend of pressure data.

11. The apparatus for the control of injection molding as claimed in claim 10, wherein the first and second inputs are assigned linguistic terms of small, medium and large within given ranges.

12. The apparatus for the control of injection molding as claimed in claim 8, wherein said processing means calculates a ratio of differential pressures from different time intervals for input to said fuzzy inference system.

* * * * *